United States Patent
Sakakibara et al.

(10) Patent No.: US 11,578,994 B2
(45) Date of Patent: Feb. 14, 2023

(54) FIXING STRUCTURE

(71) Applicant: AISIN CORPORATION, Kariya (JP)

(72) Inventors: Kohei Sakakibara, Kariya (JP); Naoya Yoshizawa, Kariya (JP)

(73) Assignee: AISIN CORPORATION, Aichi (JP)

( * ) Notice: Subject to any disclaimer, the term of this patent is extended or adjusted under 35 U.S.C. 154(b) by 522 days.

(21) Appl. No.: 16/818,238

(22) Filed: Mar. 13, 2020

(65) Prior Publication Data

US 2020/0378796 A1    Dec. 3, 2020

(30) Foreign Application Priority Data

May 30, 2019  (JP) .............................. JP2019-101434

(51) Int. Cl.
| | | |
|---|---|---|
| *G01D 5/14* | (2006.01) | |
| *F16F 15/18* | (2006.01) | |
| *F16F 15/167* | (2006.01) | |
| *F16F 1/00* | (2006.01) | |
| *F16F 15/067* | (2006.01) | |
| *B60T 7/04* | (2006.01) | |
| *B60K 26/02* | (2006.01) | |

(52) U.S. Cl.
CPC .............. *G01D 5/142* (2013.01); *F16F 1/00* (2013.01); *F16F 15/067* (2013.01); *F16F 15/167* (2013.01); *F16F 15/18* (2013.01); *B60K 26/02* (2013.01); *B60T 7/042* (2013.01)

(58) Field of Classification Search
CPC ... G01D 5/142; F16B 1/02; F16B 1/04; F16B 2001/0092
See application file for complete search history.

(56) References Cited

U.S. PATENT DOCUMENTS

| | | | | |
|---|---|---|---|---|
| 9,631,949 | B2 * | 4/2017 | Ueno ...................... | G01D 5/145 |
| 2007/0108967 | A1 * | 5/2007 | Okuya ................... | G01D 5/145 |
| | | | | 324/207.2 |
| 2008/0106873 | A1 * | 5/2008 | Okuya ..................... | G05G 1/38 |
| | | | | 361/748 |
| 2014/0047913 | A1 * | 2/2014 | Waite .................. | G01M 17/007 |
| | | | | 73/117.01 |

FOREIGN PATENT DOCUMENTS

| | | | |
|---|---|---|---|
| JP | 2002350178 A | | 12/2002 |
| JP | 2019211302 A | * | 12/2019 |

* cited by examiner

*Primary Examiner* — Daniel D Yabut
(74) *Attorney, Agent, or Firm* — Buchanan Ingersoll & Rooney PC

(57) ABSTRACT

A fixing structure includes a housing including a first hole, an input member including a second hole, and rotating relative to the housing, depending on input of rotational force, a torsion spring being biased so as to return, to a predetermined reference position, a position of the input member relative to the housing, and a fixing member inserted into the first hole and the second hole in a state where the input member is rotated against biasing force of the torsion spring from the reference position to a predetermined rotational position. The fixing member includes a first insertion portion including a part press-fitted into and fixed to the first hole, and a second insertion portion including a part inserted into the second hole, and fixes the input member at the predetermined rotational position.

18 Claims, 6 Drawing Sheets

FIXING STRUCTURE

CROSS REFERENCE TO RELATED APPLICATIONS

This application is based on and claims priority under 35 U.S.C. § 119 to Japanese Patent Application 2019-101434, filed on May 30, 2019, the entire content of which is incorporated herein by reference.

TECHNICAL FIELD

This disclosure generally relates to a fixing structure that fixes, at a predetermined rotational position set by using a fixed-side unit as reference, a rotation-side unit rotatable relative to the fixed-side unit.

BACKGROUND DISCUSSION

Conventionally, a rotation sensor detecting input rotational force has been used. As such a rotation sensor, there is a rotation sensor that includes a housing, an input member to which rotational force is input, a rotational member integrally rotatable together with the input member relative to the housing, and a torsion spring being provided between the housing and the rotational member and returning the input member and the rotational member to a predetermined reference position. In some cases, at the time of being attached to an attachment portion, such a rotation sensor is attached in a state where the input member and the rotational member are fixed at a predetermined rotational position that is set in the housing and that is different from the reference position. An example as a technique used in such attaching is described in JP 2002-350178 A (Reference 1).

Reference 1 describes a reference position setting device that sets an attachment reference position when a movable member moving relative to an attachment portion is attached to the attachment portion. The reference position setting device is configured in such a way that an elongated hole is formed in a fixing member for fixing a lever of a sensor body at a preset position, and that the fixing can be performed while fine adjustment is performed. The fixing is performed by fastening with a screw.

In the technique described in Reference 1, fixing to the sensor body is performed by fastening the fixing member with a screw, and thus, two components (the screw and the fixing member) are necessary. For this reason, there is room for improvement in cost reduction. Further, a projection that engages with the lever is provided so as to protrude from a side surface of the fixing member, and at the time of the fixing, while the projection is made to pass through a lower side of the lever, the projection needs to be engaged with the lever, and fastening needs to be performed with a screw. For this reason, workability for assembling is insufficient, and there is room for improvement. Furthermore, such work is not easily automated, and thus needs to be performed by a worker, and there is room for reduction in manufacturing cost.

A need thus exists for a fixing structure which is not susceptible to the drawback mentioned above.

SUMMARY

A fixing structure according to this disclosure includes a housing, an input member, a torsion spring, and a fixing member. The housing includes a first hole. The input member includes a second hole, and rotates relative to the housing, depending on input of rotational force. The torsion spring is biased so as to return, to a predetermined reference position, a position of the input member relative to the housing in a rotational direction. The fixing member is inserted extending over the first hole and the second hole in a state where the input member is rotated against biasing force of the torsion spring from the reference position to a predetermined rotational position where the first hole and the second hole at least partially overlap with each other in a plan view. The fixing member includes a first insertion portion including a part press-fitted into and fixed to the first hole, and includes a second insertion portion including a part inserted into the second hole. The fixing member fixes the input member at the predetermined rotational position.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

A fixing structure according to this disclosure includes a function of fixing, to a fixed-side unit, a rotation-side unit rotating depending on biasing force of a spring, in a state of being positioned at a predetermined rotational position. The following describes the fixing structure according to the present embodiment. The following description is made by citing, as an example, a rotational angle detection sensor 1 including the fixing structure. For example, the rotational angle detection sensor 1 is used in detecting an operation amount of an operated member 90 such as an accelerator pedal or a brake pedal of a vehicle.

Figure 1:
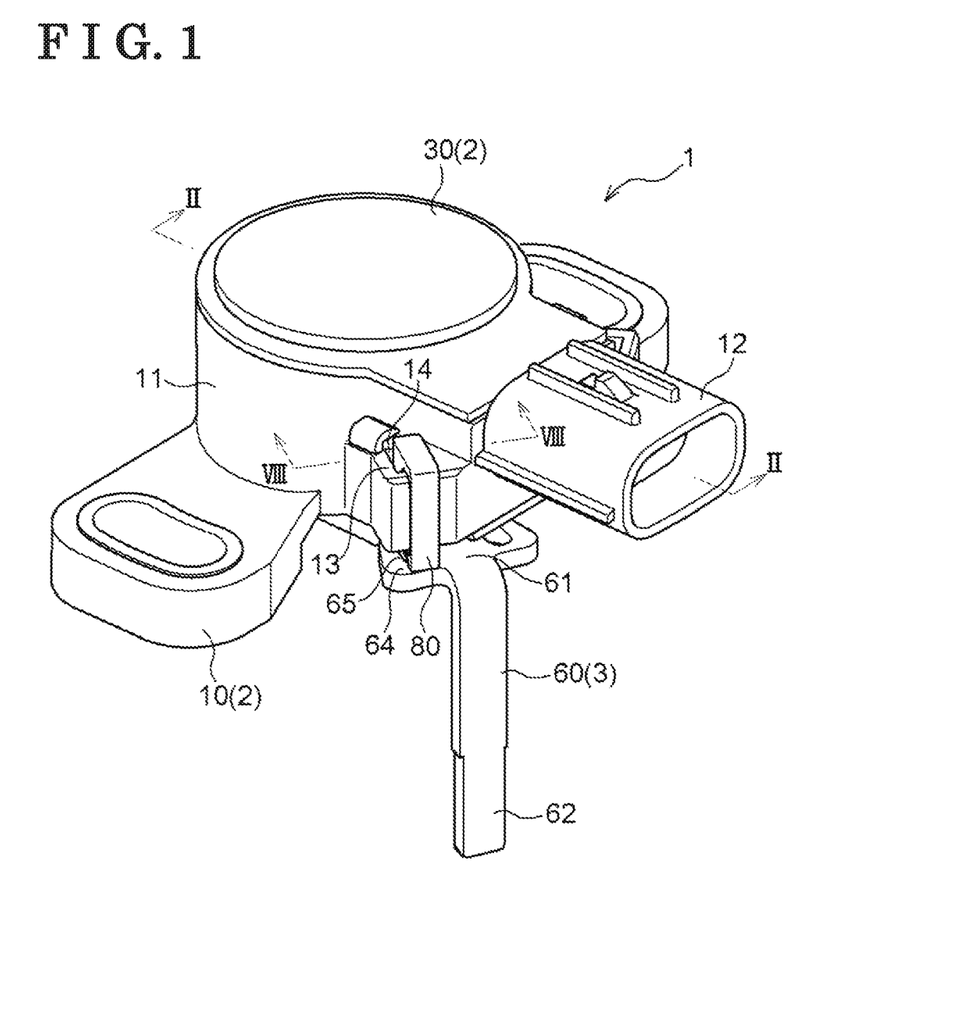
FIG. 1 is a perspective view of a rotational angle detection sensor that includes a fixing structure.
Figure 2:
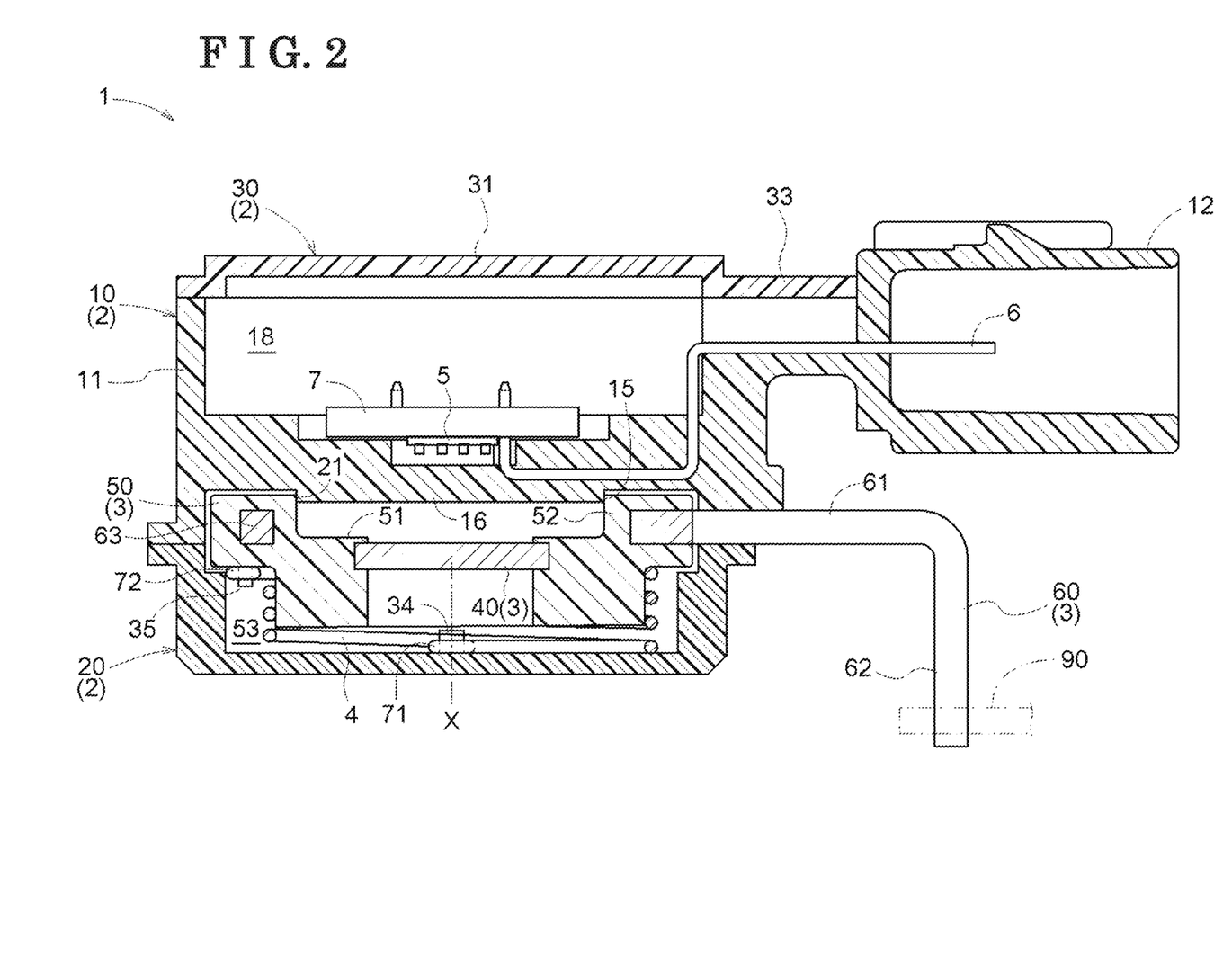
FIG. 2 is a cross-sectional view taken along line II-II in FIG. 1.
Figure 3:
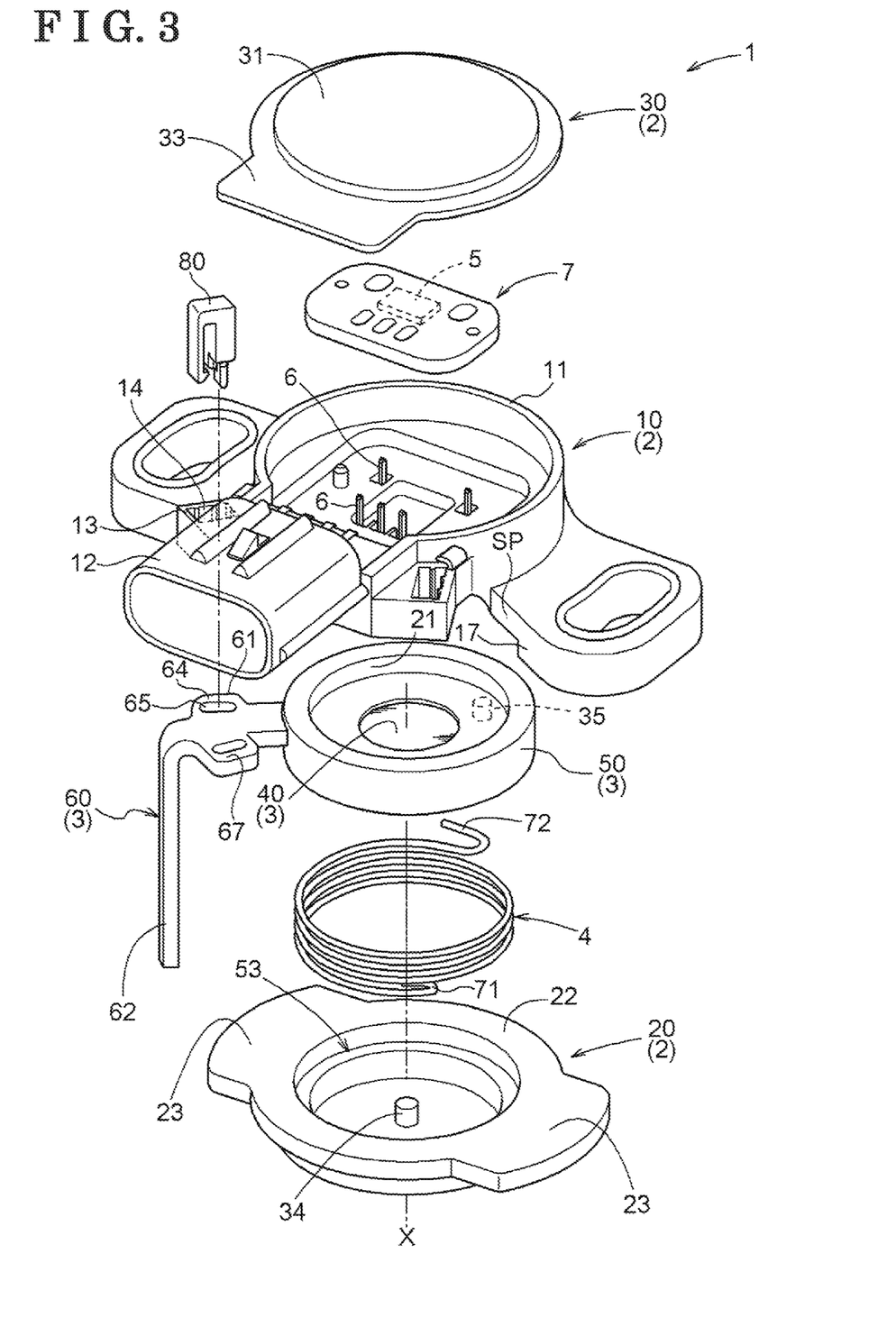
FIG. 3 is an exploded perspective view of the rotational angle detection sensor that includes the fixing structure.

FIG. 1 is a perspective view of the rotational angle detection sensor 1, FIG. 2 is a cross-sectional view taken along the line II-II in FIG. 1, and FIG. 3 is an exploded perspective view of the rotational angle detection sensor 1. As illustrated in FIG. 1 to FIG. 3, the rotational angle detection sensor 1 includes a fixed-side unit 2, a rotation-side unit 3, and a torsion spring 4. The fixed-side unit 2 is fixed to a part (e.g., a non-rotating casing of a device, such as a vehicle body in the case of a vehicle) serving as reference for detecting a rotational angle that is a detection target of the rotational angle detection sensor 1. The rotation-side unit 3 rotates relative to the fixed-side unit 2, depending on input of force that causes a rotational angle as a detection target of the rotational angle detection sensor 1. The fixed-side unit 2 includes a housing 10, a holder 20, and a cover member 30. The rotation-side unit 3 includes a permanent magnet 40, a rotational member 50, and an input member 60.

In the housing 10, a magnetic detection element 5 is installed. The housing 10 includes a body portion 11 and a terminal portion 12. The body portion 11 and the terminal portion 12 are integrally formed by using resin. Inside the body portion 11, an element accommodation chamber 18 is formed. In the terminal portion 12, a plurality of lead terminals 6 are arranged in a state of being exposed. The magnetic detection element 5 is an element capable of detecting magnitude of magnetism, and can be configured by using a Hall element, for example. Since a detection signal of the Hall element is weak, the magnetic detection element 5 is preferably a Hall IC in which an amplification circuit amplifying the detection signal and the Hall element are integrated with each other. The magnetic detection element 5 is mounted in a substrate 7, and is accommodated in the above-described element accommodation chamber 18. To the substrate 7, the above-described lead terminals 6 are connected, and via the lead terminals 6, a detection result of the rotational angle detection sensor 1 can be output to an outside. The rotational angle detection sensor 1 is supported by the above-described casing (a vehicle body in the case of a vehicle) via the terminal portion 12.

The body portion 11 of the housing 10 is provided with a protrusion portion 13 protruding toward a lateral side from an outer circumferential wall of the body portion 11, and the protrusion portion 13 is provided with a first hole 14 penetrating through the protrusion portion 13. In the present embodiment, the protrusion portion 13 is provided so as to protrude towards a radial-direction outside with respect to an axis (the below-described rotational axis X) of a tubular body that configures the outer circumferential wall of the body portion 11. The first hole 14 is configured so as to include an opening of a quadrilateral shape and include inner walls parallel with the rotational axis X, and in such a way that one of the four inner walls constituting the quadrilateral shape includes a surface perpendicular to a circumferential direction of the tubular body. Accordingly, the first hole 14 is configured so as to penetrate through the protrusion portion 13 along the rotational axis X.

The permanent magnet 40 is arranged so as to face the magnetic detection element 5. The permanent magnet 40 is arranged so as to face the magnetic detection element 5 in a state of being separated from the magnetic detection element 5 by a gap, and in such a way that a magnetic flux caused by a magnetic pole of the permanent magnet 40 passes through the magnetic detection element 5. A material of the permanent magnet 40 is not particularly limited, and examples usable as the magnet 40 include a neodymium magnet, a samarium magnet, an alnico magnet, and a ferrite magnet. A method of manufacturing the permanent magnet 40 is also not particularly limited, and examples usable as the magnet 40 include a bonded magnet (plastic magnet) and a sintered magnet. As the permanent magnet 40, an appropriate one can be selected in consideration of a relation with detection sensitivity of the magnetic detection element 5.

In the present embodiment, the permanent magnet 40 having a columnar shape is used, and is magnetized in such a way that at least one pair of magnetic poles (an N pole and an S pole) occur at one axial-direction surface. Thereby, the magnetic pole at the surface and facing the magnetic detection element 5 can be changed depending on rotational force input to the below-described input member 60, and the rotational angle detection sensor 1 can detect a rotational angle.

The rotational member 50 holds the permanent magnet 40, and is supported so as to be rotatable relative to the housing 10. The rotational member 50 includes a magnet holding portion 51 and a tubular portion 52. The magnet holding portion 51 and the tubular portion 52 are formed by resin molding, and at this time, are molded integrally with each other so as to internally include the permanent magnet 40. Thereby, the magnet holding portion 51 can hold the permanent magnet 40. The magnet holding portion 51 is formed in a disk shape, and the permanent magnet 40 is held in a state where the one axial-direction surface of the columnar permanent magnet 40 is exposed at one axial-direction surface of the disk-shaped magnet holding portion 51. The tubular portion 52 is formed in a cylindrical shape coaxially with the magnet holding portion 51. The rotational member 50 is provided so as to be rotatable even when the housing 10 is fixed to a casing of another device.

The input member 60 is supported by the rotational member 50, and rotational force is input to the input member 60. The rotational force is force causing a rotational angle that is a detection target of the rotational angle detection sensor 1. Accordingly, depending on input of rotational force, the input member 60 rotates integrally with the rotational member 50, relative to the housing 10. In the present embodiment, as described above, the permanent magnet 40 and the rotational member 50 are molded integrally with each other, and it is preferable that at the time of this integral molding, the input member 60 is also molded integrally therewith. Thereby, depending on rotational force input to the input member 60, the input member 60, the rotational member 50, and the permanent magnet 40 (the rotation-side unit 3) can integrally rotate. To the input member 60, an operated member 90 is connected and fixed. Thereby, rotational force depending on an operated amount of the operated member 90 can be input to the input member 60.

The input member 60 includes an arm portion 61, a lever portion 62, and an annular portion 63. The arm portion 61 is formed so as to extend toward a radial-direction outside from the rotational member 50. The term "toward a radial-direction outside from the rotational member 50" corresponds to a direction facing outward from the outer circumferential surface of the rotational member 50. More specifically, this term corresponds to a direction (radial direction) perpendicular to the rotational axis X when the rotation member 50 is viewed along the rotation center X. In the present embodiment, the arm portion 61 is formed so as to extend by a predetermined length along the radial direction from the rotational axis X. The lever portion 62 is formed so as to extend from the arm portion 61 along the axial direction of the rotational member 50. In the present embodiment, the lever portion 62 is formed so as to be bent, at an outer end (radial-direction outer end) of the arm portion 61, to the direction perpendicular to the extending direction of the arm portion 61. The lever portion 62 is provided with the above-described operated member 90 to which rotational force is input. The annular portion 63 is formed in an annular shape.

In the present embodiment, the annular portion 63 is formed in an annular shape. The input member 60 is integrated with the rotational member 50 via the annular portion 63 in a state where at least a part of the annular portion 63 is included in an inside of the rotational member 50. Thereby, the rotational member 50 can rotate depending on rotational force input to the input member 60.

The arm portion 61 is provided with a radial-direction protrusion portion 64 that protrudes from the arm portion 61 in a radial direction of the annular portion 63, and the radial-direction protrusion portion 64 is provided with a second hole 65 that penetrates through the radial-direction protrusion portion 64. In the present embodiment, similarly to the first hole 14, the second hole 65 is configured so as to include an opening of a quadrilateral shape, and in such a way that one of four inner walls constituting the quadrilateral shape includes a surface perpendicular to the circumferential direction of the tubular body. Accordingly, the second hole 65 is configured so as to penetrate through the radial-direction protrusion portion 64 along the rotational axis X.

The holder 20 accommodates the rotational member 50, and is supported by the housing 10. The holder 20 includes a body portion 22 and a pair of flange portions 23 extending from the body portion 22 in directions opposite to each other. In an inside (a radial-direction inside) of the body portion 22, a spring accommodation chamber 53 is formed. The holder 20 is formed by resin molding, and is positioned and fixed to the housing 10. With such a configuration, the input member 60, the rotational member 50, and the permanent magnet 40 can integrally rotate relative to the housing 10.

The cover member 30 is supported by the housing 10, and accommodates the magnetic detection element 5. The cover member 30 includes a cover portion 31 and a flange portion 33. The flange portion 33 is provided so as to extend to a radial-direction outside from the cover portion 31. The cover member 30 is fixed (e.g., fixed by adhesive) with the flange portion 33 being positioned in relation to an opening shape of the housing 10. Thereby, the cover portion 31 is made to be in a state of covering and sealing the housing 10, preventing the magnetic detection element 5 from being exposed to liquid or dust. Such a cover member 30 is configured by resin molding of the cover portion 31 and the flange portion 33.

The torsion spring 4 is accommodated in the spring accommodation chamber 53 formed by the housing 10 and the rotational member 50, and is biased so as to return, to a predetermined reference position, a rotational-direction position of the input member 60 relative to the housing 10. More specifically, the spring accommodation chamber 53 corresponds to a space formed inside the body portion 22 and covered by the magnet holding portion 51.

The torsion spring 4 is formed in a tubular shape. Particularly, in the present embodiment, the torsion spring 4 is formed in a shape along an outer circumferential surface of the magnet holding portion 51 of the rotational member 50. The torsion spring 4 is wound in such a way that the rotational member 50 rotates against biasing force of the torsion spring 4 when the rotational member 50 rotates depending on rotational force input to the input member 60. In the present embodiment, the torsion spring 4 is wound so as to be wound and tightened (so as to increase the number of times of being wound) when the rotational member 50 rotates depending on rotational force input to the input member 60. Accordingly, the above-mentioned term "predetermined reference position" corresponds to a position where with small rotational force being applied to the torsion spring 4, rotation in a direction of further decreasing the rotational force is prevented by contacting against the housing 10 (the position in a state where a protrusion portion 67 of the input member 60 contacts against a reception portion 17 of the housing 10, i.e., the position designated by the reference symbol "SP" in FIG. 3). The rotational member 50 rotates against biasing force of the torsion spring 4, depending on input of the rotational force.

For the rotational angle detection sensor 1, as illustrated in FIG. 2, the housing 10 is configured so as to include a convex body 16 protruding from a bottom surface to a side of the permanent magnet 40. The convex body 16 is configured in a columnar shape, and an outer circumferential surface 15 of the convex body 16 is configured so as to slide relative to an inner circumferential surface 21 of the tubular portion 52 of the rotational member 50. Accordingly, the outer circumferential surface 15 of the convex body 16 corresponds to a shaft member, and the inner circumferential surface 21 of the tubular portion 52 corresponds to a bearing member. An outer diameter of the outer circumferential surface 15 of the convex body 16 and an inner diameter of the inner circumferential surface 21 of the tubular portion 52 are set so as to enable mutual sliding, and meanwhile, a clearance is formed at another part (e.g., between the rotational member 50 and each of the housing 10 and the holder 20).

In the present embodiment, a first end portion 71 of the torsion spring 4 is locked by the first lock portion 34 provided in the holder 20. The first lock portion 34 can be formed as a projection protruding from a bottom surface of the holder 20. Such a first lock portion 34 may lock the first end 71 of the torsion spring 4.

Meanwhile, a second end portion 72 of the torsion spring 4 is locked by a second lock portion 35 provided in the rotational member 50. The second lock portion 35 is formed as a projection protruding toward the bottom surface of the holder 20. The second end portion 72 of the torsion spring 4 is locked by such a second lock portion 35.

Figure 4:
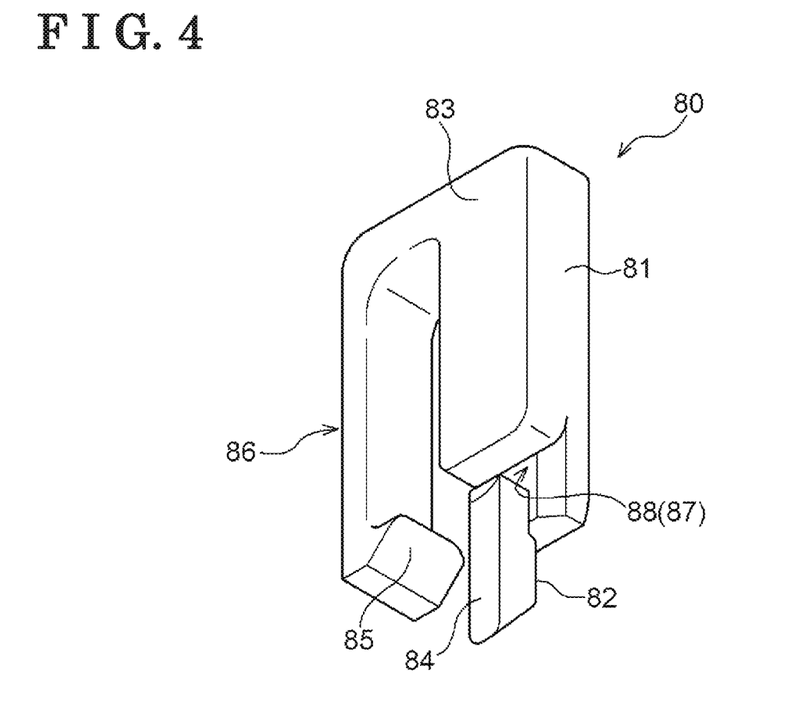
FIG. 4 is a perspective view of a fixing member.
Figure 5:
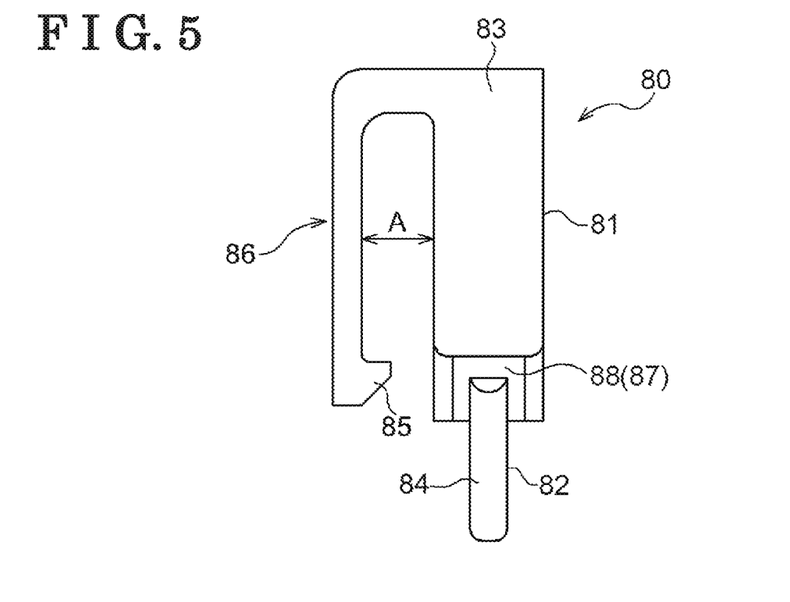
FIG. 5 is a front view of the fixing member.
Figure 6:
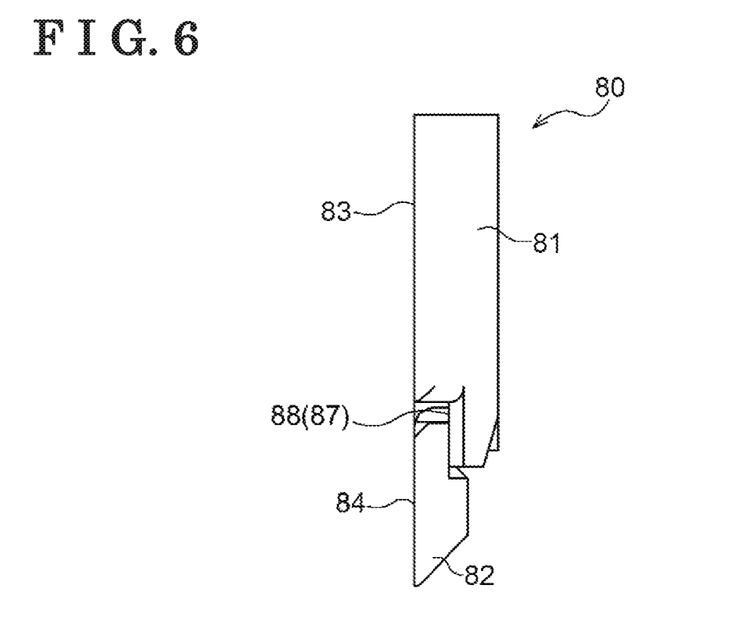
FIG. 6 is a side view of the fixing member.

FIG. 4 is a perspective view of a fixing member 80. FIG. 5 is a front view of the fixing member 80. FIG. 6 is a side view of the fixing member 80. The fixing member 80 includes a first insertion portion 81 and a second insertion portion 82. The first insertion portion 81 is configured so as to be press-fittable into and fixable to the first hole 14 of the housing 10. The first insertion portion 81 does not need to be entirely press-fitted into the first hole 14, and may be configured so as to be at least partially press-fitted into the first hole 14. Accordingly, the first insertion portion 81 is configured so as to include a part that is press-fitted into and fixed to the first hole 14.

The second insertion portion 82 is configured so as to be insertable into the second hole 65. The second insertion portion 82 also does not need to be entirely inserted into the second hole 65, and may be at least partially inserted into the second hole 65. Accordingly, the second insertion portion 82 is configured so as to include a part that is inserted into the second hole 65.

As described above, the first hole 14 is provided in the housing 10, and the second hole 65 is provided in the input member 60. By biasing force of the torsion spring 4, force of returning a rotational position of the input member 60 to the predetermined reference position is applied to the input member 60. In the present embodiment, the configuration is made in such a way that when the input member 60 is rotated from the above-described reference position to a predetermined rotational position against biasing force of the torsion spring 4, the first hole 14 and the second hole 65 at least partially overlap with each other in a plan view. In a state where such an input member 60 is rotated against biasing force of the torsion spring 4 from the above-described reference position to the predetermined rotational position, the fixing member 80 is inserted extending over the first hole 14 and the second hole 65. Accordingly, the fixing member 80 is configured so as to fix the input member 60 at the predetermined rotational position. Such a structure corresponds to the present fixing structure.

Figure 7:
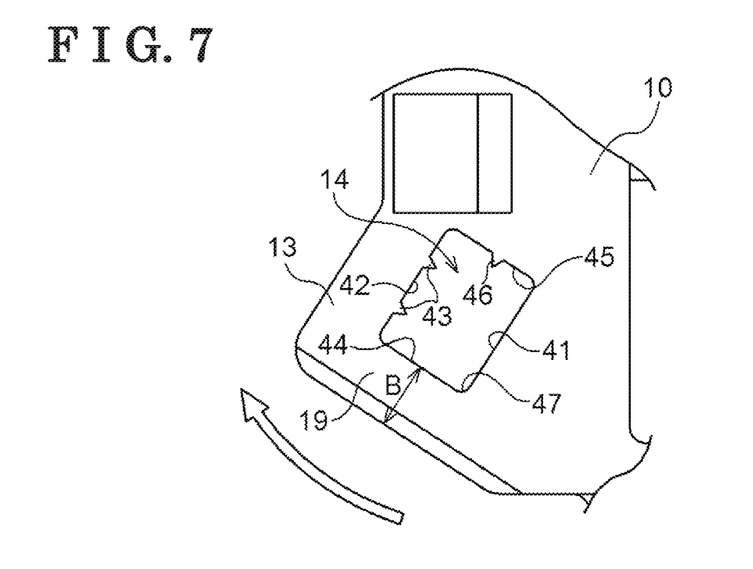
FIG. 7 is an enlarged view of a first hole.

FIG. 7 is a top view of the first hole 14. The first hole 14 includes a first surface 41 perpendicular to the rotational direction of the input member 60, and a second surface 42 mutually parallel with the first surface 41. In FIG. 7, for easy understanding, the rotational direction of the input member 60 is indicated by the white arrow, and force by which the input member 60 is caused to return to the predetermined reference position along the direction of the arrow is generated by biasing force of the torsion spring 4. The first surface 41 and the second surface 42 are provided so as to be perpendicular to such force. In the present embodiment, the first surface 41 is an upstream surface when the input member 60 is caused to return to the predetermined reference position by biasing force of the torsion spring 4, and the second surface 42 is a downstream surface when the input member 60 is caused to return to the predetermined reference position by biasing force of the torsion spring 4. Accordingly, the second surface 42 is a surface to which the input member 60 applies force of causing the input member 60 to return to the reference position depending on biasing force of the torsion spring 4. The term "mutually parallel" indicates that an interval between the first surface 41 and the second surface 42 is uniform.

In the present embodiment, a first pressing portion 43 that presses the fixing member 80 toward the first surface 41 is provided on the second surface 42. The first pressing portion 43 is configured by a protrusion body protruding from the second surface 42 to the first surface 41. In the present embodiment, two first pressing portions 43 are provided on the second surface 42. The first pressing portions 43 have a uniform protrusion height from the second surface 42. The first pressing portion 43 presses the first insertion portion 81 of the fixing member 80 toward the first surface 41, and the first insertion portion 81 is thereby press-fitted into and fixed to the first hole 14. At this time, a surface 83 of the first insertion portion 81 contacts with the entirety of the first surface 41. A surface 84 of the second insertion portion 82 contacts against the entirety of a predetermined surface (an upstream surface when the input member 60 is caused to return to the predetermined reference position by biasing force of the torsion spring 4) of the second hole 65.

As illustrated in FIG. 4 to FIG. 6, the fixing member 80 is configured in such a way that the surface 83 included in the first insertion portion 81 and facing the first surface 41 is on the same plane including the surface 84 that is included in the second insertion portion 82 and to which the input member 60 applies force of causing the input member 60 to return to the predetermined reference position. The surface 83 included in the first insertion portion 81 and facing the first surface 41 is a surface that is among surfaces of the first insertion portion 81 and that faces the first surface 41 in the first hole 14 when the first insertion portion 81 is press-fitted into and fixed to the first hole 14. The surface 84 that is included in the second insertion portion 82 and to which the input member 60 applies force of causing the input member 60 to return to the predetermined reference position is a surface that is among surfaces of the second insertion portion 82 and that is pressed by the input member 60 depending on biasing force of the torsion spring 4 when the second insertion portion 82 is press-fitted into and fixed to the second hole 65. The term "is on the same plane" indicates that when the first insertion portion 81 and the second insertion portion 82 are viewed along the insertion direction into the first hole 14 and the second hole 65, heights in a direction that is perpendicular to the insertion direction and in which biasing force of the torsion spring 4 is generated are the same. In other words, the term indicates that heights from the insertion axis are the same. Accordingly, the fixing member 80 is configured in such a way that the surface 83 and the surface 84 have the same height from the axis of the insertion into the first hole 14 and the second hole 65.

Figure 8:
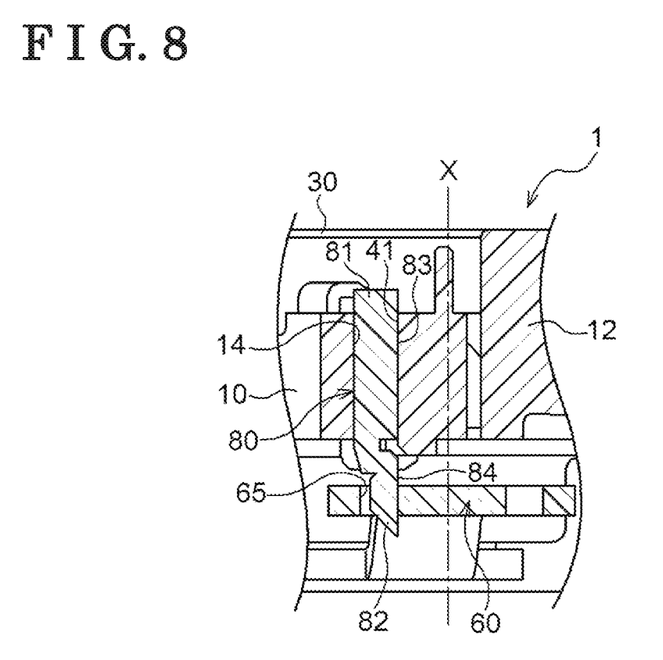
FIG. 8 is a cross-sectional view taken along line VIII-VIII in FIG. 1.

FIG. 8 is a cross-sectional view taken along the line VIII-VIII in FIG. 1. As illustrated in FIG. 8, in the fixing member 80, the first insertion portion 81 is press-fitted into and fixed to the first hole 14 of the housing 10, and the second insertion portion 82 is inserted into the second hole 65 of the input member 60. In FIG. 8, force in a direction (a left side in the drawing) perpendicular to the rotational axis X is applied to the input member 60 by biasing force of the torsion spring 4. Meanwhile, the fixing member 80 is positioned by the first surface 41 relative to the housing 10. As described above, the fixing member 80 is configured in such a way that the surface 83 and the surface 84 are on the same plane. Accordingly, as illustrated in FIG. 8, the fixing member 80 can position the input member 60 relative to the housing 10 by using the surface 83 and the surface 84 as reference.

As illustrated in FIG. 7, a surface included in the first hole 14 and intersecting with the first surface 41 and the second surface 42 is referred to as a third surface 44. In the present embodiment, the third surface 44 is a surface that is among surfaces of the first hole 14, that intersects with the first surface 41 and the second surface 42, and that is on a radial-direction outside when viewed from the rotational axis X.

In such a configuration, as illustrated in FIG. 4 to FIG. 6, the fixing member 80 includes a snap fit portion 86 that applies force in a direction of pressing the first insertion portion 81 against the third surface 44 and that includes a nail portion 85 locked by the housing 10. The fixing member 80 is formed in such a way that an interval A (refer to FIG. 5) between a snap fit portion 86 and the first insertion portion 81 is smaller than a length B of a radial-direction outer part 19 (refer to FIG. 7) of the protrusion portion 13 in the housing 10 along a radial direction thereof. Thereby, in a state where the first insertion portion 81 is inserted into the first hole 14, the snap fit portion 86 is expanded relative to the first insertion portion 81 by the radial-direction outer part 19, and force in a direction of pressing the first insertion portion 81 against the third surface 44 is applied to the fixing member 80. The snap fit portion 86 is provided with the nail portion 85 that is locked by the housing 10, and the first insertion portion 81 in such a state can be prevented from falling out of the first hole 14.

In the present embodiment, as illustrated in FIG. 7, on the surface 45 that is included in the first hole 14 and that is on a side of facing the third surface 44, there is provided a second pressing portion 46 that presses the first insertion portion 81 to a side of the third surface 44. The surface 45 that is included in the first hole 14 and that is on the side of facing the third surface 44 is a surface that is among surfaces included in the first hole 14 and that is on a radial-direction inner side when viewed in the rotational axis X. The second pressing portion 46 is provided so as to protrude from such a surface 45 to a radial-direction outside when viewed in the rotational axis X. In the present embodiment, the configuration is made in such a way that the protruding height to the radial-direction outside is uniform. Thus, the first insertion portion 81 in a state of being pressed to a side of the first surface 41 by the first pressing portion 43 can be pressed to a side of the third surface 44 by the second pressing portion 46. Accordingly, the first insertion portion 81 can be positioned by using, as reference, a corner 47 configured by the first surface 41 and the third surface 44.

Making the above-described state enables a relative position of the input member 60 to the housing 10 to be maintained at a preset position. In this state, the rotational angle detection sensor 1 is installed at a preset position. However, in this state, the input member 60 is fixed to the housing 10 by the fixing member 80.

In view of it, as illustrated in FIG. 4 to FIG. 6, between the first insertion portion 81 and the second insertion portion 82, there is provided a break assist portion 87 that assists the second insertion portion 82 in breaking in such a way that the second insertion portion 82 breaks when rotational force is input to the input member 60 in a state where the fixing member 80 is inserted into the first hole 14 and the second hole 65. The term "when rotational force is input to the input member 60 in a state where the fixing member 80 is inserted into the first hole 14 and the second hole 65" indicates the case where rotational force against biasing force of the torsion spring 4 is input to the input member 60 at the first time in a state where the fixing member 80 is inserted into the first hole 14 and the second hole 65 as illustrated in FIG. 8. In such a case, the second insertion portion 82 fractures from the first insertion portion 81 by the rotation of the input member 60. Thus, the break assist portion 87 is provided in such a way that the second insertion portion 82 easily breaks from the first insertion portion 81.

In the present embodiment, the break assist portion 87 corresponds to a groove portion 88 between the first insertion portion 81 and the second insertion portion 82. Thereby, force depending on rotation of the input member 60 is applied to the second insertion portion 82, enabling the second insertion portion 82 to break at the groove portion 88. The fixing member 80 in a state where the second insertion portion 82 is broken is locked to the housing 10 by the nail portion 85 of the snap fit portion 86 with the first insertion portion 81 being inserted into the first hole, and thus, a function the rotational angle detection sensor 1 is not impaired.

Other Embodiments

Although the fixing structure is described above by citing the rotational angle detection sensor 1 as an example in the above-described embodiment, the fixing structure can be applied to others but the rotational angle detection sensor 1.

Although in the above-described embodiment, the description is made above on the case where the first hole 14 includes the first surface 41 perpendicular to the rotational direction of the input member 60 and the second surface 42 parallel with the first surface 41, a configuration may be made in such a way that the hole 14 includes a second surface 42 perpendicular to the rotational direction of the input member 60 and a first surface 41 parallel with the second surface 42. The first surface 41 and the second surface 42 do not need to be parallel to each other. Further, the first surface 41 and the second surface 42 do not need to be perpendicular to the rotational direction of the input member 60.

Although in the above-described embodiment, the description is made above on the case where the surface 83 included in the first insertion portion 81 and facing the first surface 41 is on the same plane including the surface 84 that is included in the second insertion portion 82 and to which the input member 60 applies force of causing the input member 60 to return to the predetermined reference position, the surface 83 and the surface 84 do not need to be configured so as to be on the same plane.

In the above-described embodiment, the fixing member 80 includes the snap fit portion 86 that applies force in a direction of pressing the first insertion portion 81 against the third surface 44 and that includes the nail portion 85 locked by the housing 10, the fixing member 80 can be configured so as not to apply force in the direction of pressing the first insertion portion 81 against the third surface 44, and can be configured so as not to include the snap fit portion 86 including the nail portion 85 locked by the housing 10.

Although in the above-described embodiment, the description is made above on the case where the surface included in the first hole 14 and intersecting with the first surface 41 and the second surface 42 is the third surface 44, and the second pressing portion 46 that presses the first insertion portion 81 to a side of the third surface 44 is provided on the surface 45 that is included in the first hole 14 and that is on a side of facing the third surface 44, the second pressing portion 46 does not need to be provided on the surface 45.

In the above-described embodiment, the description is made above on the case where the break assist portion 87 is provided between the first insertion portion 81 and the second insertion portion 82 of the fixing member 80. The break assist portion 87 in the above-described embodiment is one example, and the break assist portion 87 can be configured in another form. Alternatively, without providing the break assist portion 87 in the fixing member 80, for example, a configuration may be made in such a way that the second insertion portion 82 is withdrawn from the second hole 65.

This disclosure can be used for a fixing structure that fixes, at a predetermined position set in a housing, a rotational member rotatable relative to the housing.

A fixing structure according to this disclosure includes a housing, an input member, a torsion spring, and a fixing member. The housing includes a first hole. The input member includes a second hole, and rotates relative to the housing, depending on input of rotational force. The torsion spring is biased so as to return, to a predetermined reference position, a position of the input member relative to the housing in a rotational direction. The fixing member is inserted extending over the first hole and the second hole in a state where the input member is rotated against biasing force of the torsion spring from the reference position to a predetermined rotational position where the first hole and the second hole at least partially overlap with each other in a plan view. The fixing member includes a first insertion portion including a part press-fitted into and fixed to the first hole, and includes a second insertion portion including a part inserted into the second hole. The fixing member fixes the input member at the predetermined rotational position.

According to such a characteristic configuration, the first insertion portion of the fixing member is press-fitted into and fixed to the housing, and the second insertion portion of the fixing member is inserted into the second hole of the input member, and thus, the input member can be fixed at the predetermined rotational position by one fixing member. Further, since the input member can be fixed to the housing by only press-fitting of the fixing member, work can be simplified, and assembling can be easily performed. Furthermore, the assembling can be easily automated, and cost can be reduced.

The first hole may include a first surface perpendicular to a rotational direction of the input member, and a second surface parallel with the first surface. The second surface may be a surface to which the input member applies force of causing the input member to return to the reference position, depending on biasing force of the torsion spring. A first pressing portion that presses the fixing member toward the first surface may be provided on the second surface.

According to such a configuration, the second insertion portion can be positioned by using, as a reference, the surface that is included in the first insertion portion of the fixing member and that is pressed against the first surface, and thus, the second insertion portion is precisely positioned in a state where the fixing member is press-fitted into the housing. Thereby, the input member fixed at the predetermined rotational position relative to the housing can be precisely positioned in the rotational direction. Further, the fixing member is press-fitted and fixed, thus making it difficult to remove the fixing member from the housing.

A surface being included in the first insertion portion and facing the first surface may be configured on a same plane including a surface that is included in the second insertion portion and to which the force of causing the input member to return is applied from the input member.

According to such a configuration, the surface that is included in the second insertion portion and to which the force of causing the input member to return is applied is on the same plane including the surface that is included in the first insertion portion of the fixing member and that is pressed against the first surface, and thus, the input member fixed at the predetermined rotational position relative to the housing can be more precisely positioned in the rotational direction.

A surface being included in the first hole and intersecting with the first surface and the second surface may be defined as a third surface. The fixing member may include a snap fit portion that applies force in a direction of pressing the first insertion portion against the third surface and includes a nail portion locked by the housing.

According to such a configuration, the snap fit portion causes the fixing member to be held by the housing, the fixing member can be more reliably prevented from falling out of the housing.

A surface being included in the first hole and intersecting with the first surface and the second surface may be defined as a third surface. A second pressing portion that presses the first insertion portion to a side of the third surface may be provided on a surface that is included in the first hole and that is on a side of facing the third surface.

According to such a configuration, the second pressing portion intersecting with the first pressing portion can press the fixing member against a corner portion configured by the first surface and the third surface, and thus, the second insertion portion can be more precisely positioned in a state where the fixing member is press-fitted into the housing.

A break assist portion that assists the second insertion portion in breaking may be provided between the first insertion portion and the second insertion portion in such a way that the second insertion portion breaks when the rotational force is input to the input member in a state where the fixing member is inserted into the first hole and the second hole.

According to such a configuration, the fixing member does not need to be removed from the housing when actual use is started, and the input member can be rotated by only inputting rotational force to the input member.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A fixing structure comprising:
   a housing that includes a first hole;
   an input member that includes a second hole and rotates relative to the housing, depending on input of rotational force;
   a torsion spring that is biased so as to return, to a predetermined reference position, a position of the input member relative to the housing in a rotational direction; and
   a fixing member that is inserted extending over the first hole and the second hole in a state where the input member is rotated against biasing force of the torsion spring from the reference position to a predetermined rotational position where the first hole and the second hole at least partially overlap with each other in a plan view, and includes a first insertion portion including a part press-fitted into and fixed to the first hole, and a second insertion portion including a part inserted into the second hole, wherein
   the fixing member fixes the input member at the predetermined rotational position.

2. The fixing structure according to claim 1, wherein
   the first hole includes a first surface perpendicular to a rotational direction of the input member, and a second surface parallel with the first surface,
   the second surface is a surface to which the input member applies force of causing the input member to return to the reference position, depending on biasing force of the torsion spring, and
   a first pressing portion that presses the fixing member toward the first surface is provided on the second surface.

3. The fixing structure according to claim 2, wherein a surface being included in the first insertion portion and facing the first surface is configured on a same plane including a surface that is included in the second insertion portion and to which the force of causing the input member to return is applied from the input member.

4. The fixing structure according to claim 3, wherein
   a surface being included in the first hole and intersecting with the first surface and the second surface is defined as a third surface, and
   the fixing member includes a snap fit portion that applies force in a direction of pressing the first insertion portion against the third surface and includes a nail portion locked by the housing.

5. The fixing structure according to claim 4, wherein
   a surface being included in the first hole and intersecting with the first surface and the second surface is defined as a third surface, and
   a second pressing portion that presses the first insertion portion to a side of the third surface is provided on a surface that is included in the first hole and that is on a side of facing the third surface.

6. The fixing structure according to claim 5, wherein a break assist portion that assists the second insertion portion in breaking is provided between the first insertion portion and the second insertion portion in such a way that the second insertion portion breaks when the rotational force is input to the input member in a state where the fixing member is inserted into the first hole and the second hole.

7. The fixing structure according to claim 4, wherein a break assist portion that assists the second insertion portion in breaking is provided between the first insertion portion and the second insertion portion in such a way that the second insertion portion breaks when the rotational force is input to the input member in a state where the fixing member is inserted into the first hole and the second hole.

8. The fixing structure according to claim 3, wherein
a surface being included in the first hole and intersecting with the first surface and the second surface is defined as a third surface, and
a second pressing portion that presses the first insertion portion to a side of the third surface is provided on a surface that is included in the first hole and that is on a side of facing the third surface.

9. The fixing structure according to claim 8, wherein a break assist portion that assists the second insertion portion in breaking is provided between the first insertion portion and the second insertion portion in such a way that the second insertion portion breaks when the rotational force is input to the input member in a state where the fixing member is inserted into the first hole and the second hole.

10. The fixing structure according to claim 3, wherein a break assist portion that assists the second insertion portion in breaking is provided between the first insertion portion and the second insertion portion in such a way that the second insertion portion breaks when the rotational force is input to the input member in a state where the fixing member is inserted into the first hole and the second hole.

11. The fixing structure according to claim 2, wherein
a surface being included in the first hole and intersecting with the first surface and the second surface is defined as a third surface, and
the fixing member includes a snap fit portion that applies force in a direction of pressing the first insertion portion against the third surface and includes a nail portion locked by the housing.

12. The fixing structure according to claim 11, wherein
a surface being included in the first hole and intersecting with the first surface and the second surface is defined as a third surface, and
a second pressing portion that presses the first insertion portion to a side of the third surface is provided on a surface that is included in the first hole and that is on a side of facing the third surface.

13. The fixing structure according to claim 12, wherein a break assist portion that assists the second insertion portion in breaking is provided between the first insertion portion and the second insertion portion in such a way that the second insertion portion breaks when the rotational force is input to the input member in a state where the fixing member is inserted into the first hole and the second hole.

14. The fixing structure according to claim 11, wherein a break assist portion that assists the second insertion portion in breaking is provided between the first insertion portion and the second insertion portion in such a way that the second insertion portion breaks when the rotational force is input to the input member in a state where the fixing member is inserted into the first hole and the second hole.

15. The fixing structure according to claim 2, wherein
a surface being included in the first hole and intersecting with the first surface and the second surface is defined as a third surface, and
a second pressing portion that presses the first insertion portion to a side of the third surface is provided on a surface that is included in the first hole and that is on a side of facing the third surface.

16. The fixing structure according to claim 15, wherein a break assist portion that assists the second insertion portion in breaking is provided between the first insertion portion and the second insertion portion in such a way that the second insertion portion breaks when the rotational force is input to the input member in a state where the fixing member is inserted into the first hole and the second hole.

17. The fixing structure according to claim 2, wherein a break assist portion that assists the second insertion portion in breaking is provided between the first insertion portion and the second insertion portion in such a way that the second insertion portion breaks when the rotational force is input to the input member in a state where the fixing member is inserted into the first hole and the second hole.

18. The fixing structure according to claim 1, wherein a break assist portion that assists the second insertion portion in breaking is provided between the first insertion portion and the second insertion portion in such a way that the second insertion portion breaks when the rotational force is input to the input member in a state where the fixing member is inserted into the first hole and the second hole.

* * * * *